April 14, 1964

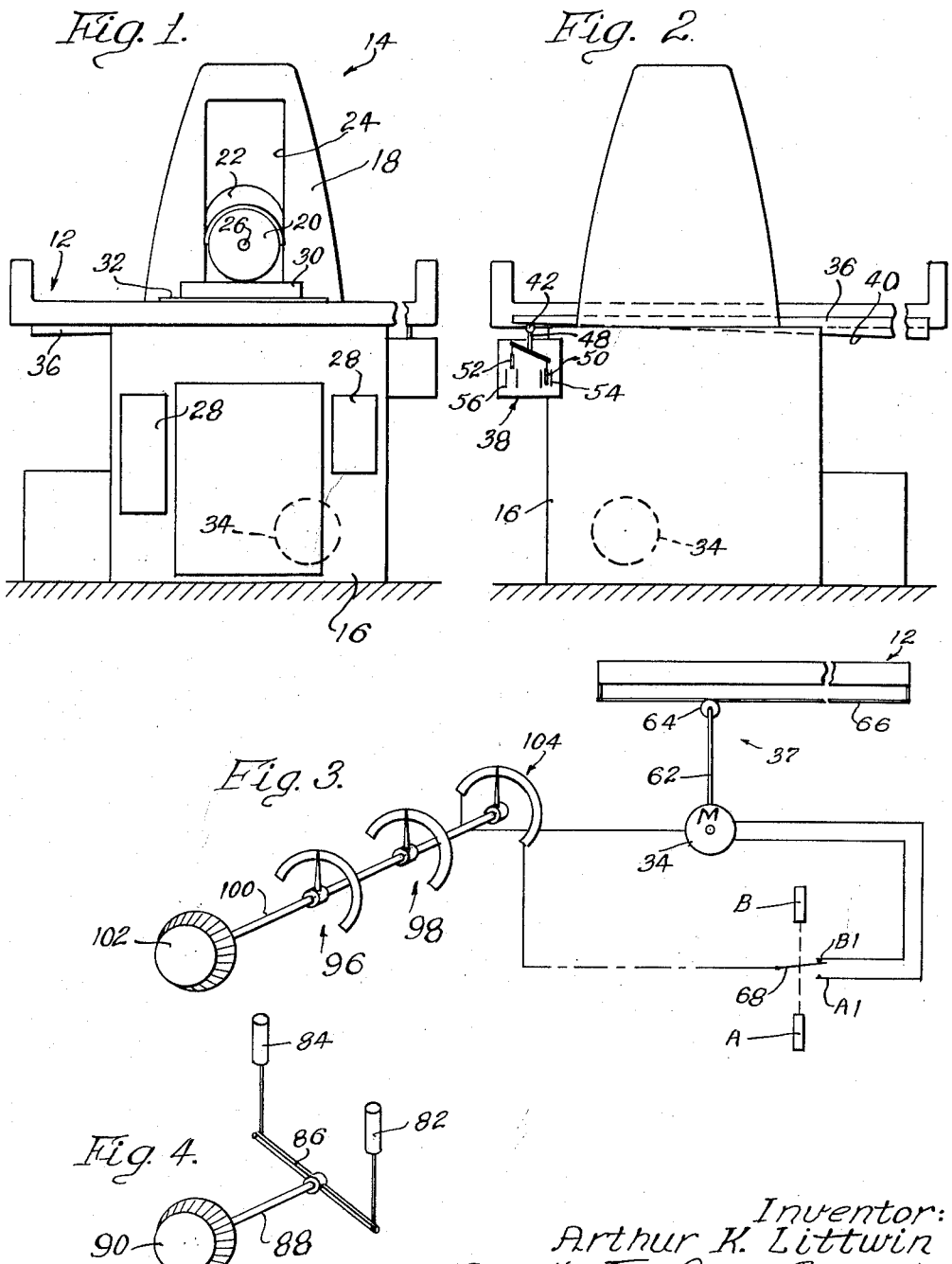

A. K. LITTWIN 3,129,369

AUTOMATIC MOTOR REVERSING AT LIMIT OF TRAVEL
BY VARIABLE TRANSFORMER MEANS

Filed July 5, 1960

Inventor:
Arthur K. Littwin
By Horton, Davis, Brewer
 + Bruguer
Attys

3,129,369
AUTOMATIC MOTOR REVERSING AT LIMIT OF TRAVEL BY VARIABLE TRANSFORMER MEANS
Arthur K. Littwin, Lincolnwood, Ill., assignor to Arthur K. Littwin, Robert L. Littwin, and Horace A. Young, as trustees, Chicago, Ill.
Filed July 5, 1960, Ser. No. 40,877
9 Claims. (Cl. 318—282)

The present invention relates to an electrical control for a machine operation.

The control of the present invention is especially adapted to control a machine tool having a reversing part such as a reciprocating table adapted for supporting a work piece on which an operation is performed by the machine tool. Such machine tool may be, for example, for grinding or milling a metal piece hold on the reciprocating table as by a magnetic chuck. The table reciprocates for carrying the work pieces past a working station at which the operation takes place. The coordination of the various parts may be, for example, that while the table carries the work piece in a reciprocating movement, the operating tool directly performing the operation moves transversely to that reciprocating movement and after a predetermined number of movements or passes, the entire surface of the work piece is operated on. The reciprocating movements of the table are an essential factor in the functioning of the machine and there are generally a great number of such movements in any given operation. In order for efficiency of the machine tool to reach a high degree, the periods in which the reciprocating table is reversing should be held to a minimum duration so that a maximum portion of the entire time of an operation is utilized in the machining operation.

There is necessarily an appreciable time factor in these reversing operations as will be understood in view of the mechanical nature of the machine tool, and the greater the reduction of the time required for the reversing operations, the greater will be the efficiency of the machine tool.

A reciprocating part such as a table may overrun its normal intended range of movement because of at least two factors, namely, speed and weight, each of which affects overrun independently of the other. The greater the speed at which the table operates and the greater the mass of the table and the work piece thereon, the greater will be the overrun. There have previously been methods and apparatus designed for eliminaing or minimizing this overrun, but so far as can be determined, none have been particularly effective for the purpose intended.

A broad object of the present invention is to provide electrical means for minimizing and, from a practical standpoint, eliminating overrun of a reversing part such as a reciprocating table in a machine tool.

Another and more specific object is to provide electrical means of the character just noted in combination with control for varying the speed of movement of the table and so coordinated with that speed control means that upon increase in speed of the movement of the table, provision is automatically made for compensating for overrun of the table in direct proportion to the increase in speed.

Another and still more specific object of the invention is to provide a reciprocating table and a means for driving the table and electrical control means for controlling that driving means in which the control means is arranged for alternately reversing the driving means in which the reversing means includes a normal build-up of voltage, controlled by the table, in combination with means for augmenting that voltage in substantially direct proportion to the increase in speed of the table.

A further object is to provide a control means of the character just previously noted in which the reversing operation is effected by oppositely acting electronic tube means and in which the tube means are controlled by build-up of voltage, in which that voltage is augmented under the control of the movement of the reciprocating table in response to increase in speed of the table so that, upon such increase in speed, the effective voltage is built up to a greater degree whereby to effect a reversing operation in quicker time as the table approaches its intended point of reversal, and overrun relative to that intended point of reversal is eliminated or minimized.

A further object is to provide control means of the general character stated for controlling the reversing movements of a reciprocating table wherein adjustments may be made for more immediately effecting the reversing functions for compensating for overrun of the table which may otherwise be occasioned because of greater mass of the reciprocating part.

Other objects and advantages of the invention will appear from the following detailed description taken in conjunction with the accompanying drawings in which:

FIGURE 1 is a front elevational view of a machine tool of the kind to which the present invention is particularly adaptable;

FIG. 2 is a rear elevational view of the same machine;

FIG. 3 is a semi-diagrammatic view of certain structural elements of the apparatus of the present invention and a fragment of the reciprocating table of the machine of FIG. 1;

FIG. 4 is another semi-diagrammatic view of certain structural elements of the apparatus.

Figure 5:
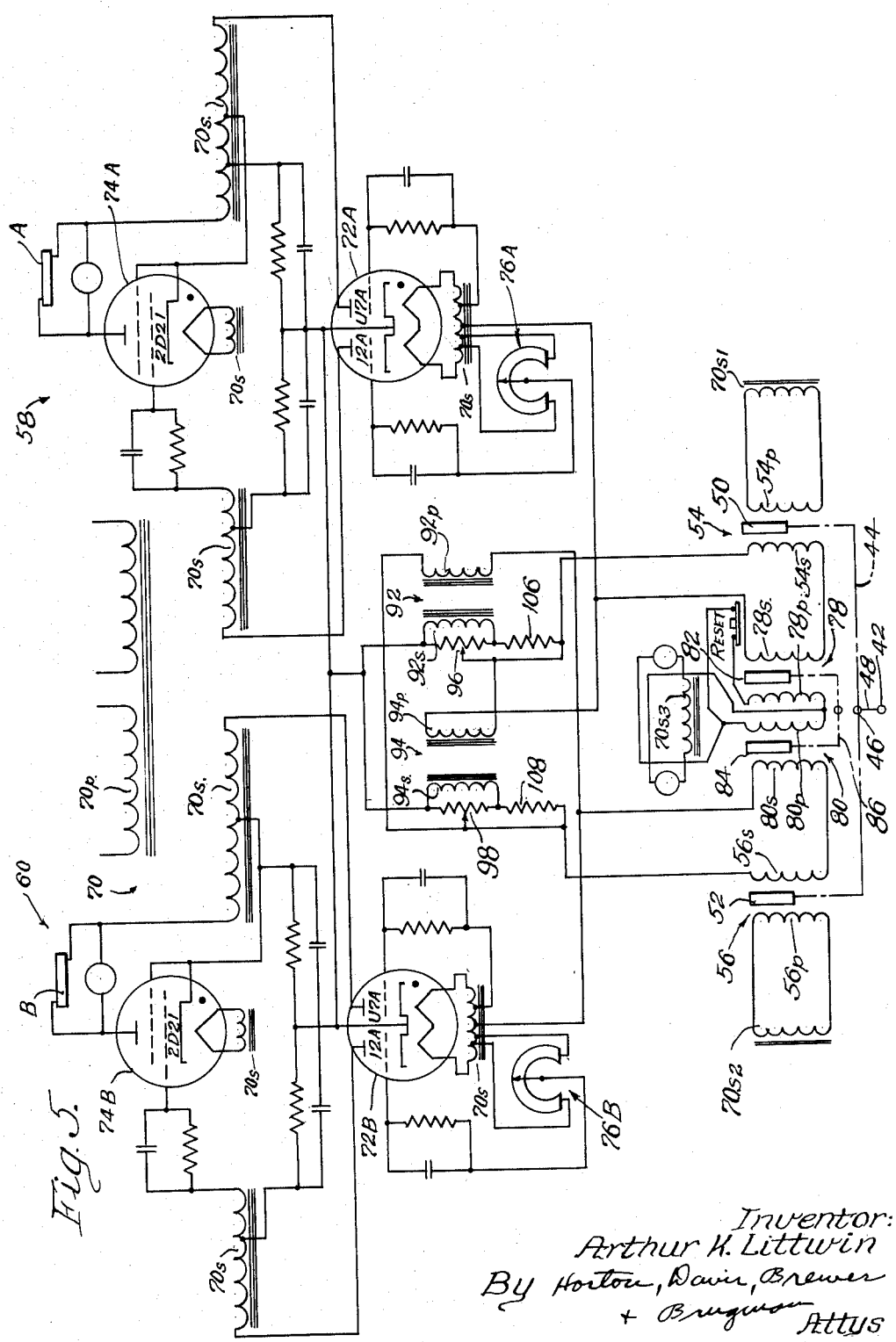
FIG. 5 is a diagram of the electrical circuit of the present invention and including certain of the elements of FIGS. 3 and 4.

Referring now in detail to the drawings, attention is directed first to FIGS. 1 and 2 showing a machine tool of the kind to which the present invention is readily adaptable. This machine tool may be any of a great number of different kinds of machines and is selected as representative of such machines in that it has a reversible part in the form of a table indicated at 12. The machine of FIGS. 1 and 2, indicated in its entirety at 14, including a base 16, and a standard 18 at the top thereof in which is mounted a working tool 20. The working tool in the present instance may be a grinding wheel operated in any suitable manner such as by a motor 22 and arranged for various movements in its operation such as vertical movements along guide surfaces 24 and other movements such as in directions along the axis of the shaft 26 on which the grinding wheel is mounted for rotation. The base 16 of the machine may be provided with various control panels 28 on which may be control elements, at least certain ones of which may be incorporated in the apparatus of the present invention. The specific arrangement of these control panels may be selected as desired.

The table 12 is mounted for reciprocating movements alternately in opposite directions, and in this respect it is to be noted that the invention is not limited to a reciprocating table but is also applicable to any reversing part such as an oscillating member.

The table 12 in the present instance is utilized for mounting a work piece 30 on which the operating tool 20 is adapted for operating. The table 12 is provided with an electro-magnetic chuck 32 arranged for controllably securing the work piece 30 on the table. The table is mounted in a known manner, the details of which do not enter into the present invention. For operating on the work piece 30 the table is reciprocated for carrying the work piece reversibly in a path under the grinding wheel 20. The grinding wheel 20 is put into operating position as by lowering it from an upper inoperative position into engagement with the work piece. Upon rotation of the grinding wheel when in engagement with the work piece and in response to reciprocation of the table, the surface of the work piece is treated. A common operation in the use of this type of machine involves movement also of the grinding wheel in and out along the axis of the shaft 26 in addition to the other movements mentioned, for treating a surface of the work piece wider than the thickness of the grinding wheel. The present invention has to do with control of the reciprocating table 12 and more specifically with the control of the reversing operation thereof.

Suitable means is provided for driving the table 12 such as an electric motor 34 operating through a suitable drive indicated diagrammatically at 37 in FIG. 3. Any of various instrumentalities may be used for driving the table such as electric motor, hydraulic ram, mechanical linkage, etc., and in each case the driving means represented by the motor 34 is reversible, or alternatively, the drive between the motor and the table is reversible for reversing the table at the limit of movement in each direction. Such driving means and drive transmission means are of known type and the invention is not limited to any specific form of such driving means. The driving means, whatever the form it assumes, also is of variable speed character. The driving means will be referred to again hereinbelow.

The apparatus of the present invention involves the circuit of FIG. 5 and includes certain portions of the control disclosed and claimed in my co-pending application Serial No. 637,140 filed January 30, 1957, now Patent No. 3,045,165, issued July 17, 1962. Among the features of that application are a taper bar 36 and an electric control means 38 mounted on the machine and cooperating with the taper bar. This electric control means is shown at the lower portion of FIG. 5. The taper bar 36 is mounted on and carried by the reciprocating table 12 extending therealong a length equivalent to or corresponding to the maximum range of movement of the table in its reciprocation. For example, the taper bar 36 may extend the full length of the table when it is desired to move the table its full length in the operation thereof. The taper bar 36 has a lower inclined surface 40 co-acting directly with a follower 42 in the control means 38. The control means 38 includes a beam 44 pivoted on an axis 46 for swinging movements thereon, and extending from the beam at the axis 46 is an operating arm 48 having the follower 42 above-mentioned mounted on its swinging end. On opposite ends of the beam 44 are armatures 50 and 52 operable in transformers 54 and 56 respectively. These elements just described will be referred to again hereinbelow in greater detail. For present purposes, it may be stated that in response to reciprocation of the table, the inclined surface 40 of the taper bar engages the follower 42 and rocks the beam 44 in appropriate direction corresponding to the direction of travel of the table. For example, in an assumed starting position, such as that shown in FIG. 2, the beam 44 is in such position that the armature 50 is extended into the corresponding transformer 54 while the opposite armature 52 is relatively retracted from its corresponding transformer 56. Upon movement of the table toward the opposite position (to the left, FIG. 2), the beam 44 is rocked in counterclockwise direction, gradually projecting the armature 52 into its transformer 56 and retracting the armature 50 from its transformer 54. The opposite movements are effected upon movement of the table in opposite direction, or to the right, FIG. 2.

Referring briefly and generally to the circuit of FIG. 5, this circuit includes two main control sides indicated generally at 58 and 60, each of which when energized performs a corresponding reversing operation at the respective end of the travel of the table. Included in the circuit portion 58 is a relay A coil (upper right) and in the circuit portion 60 is a relay B coil (upper left), which are shown in the diagrammatic illustration of FIG. 3, arranged for controlling the direction of movement of the table. As shown in FIG. 3 the diagrammatically illustrated drive transmission 37 from the motor 34 to the table 12 includes a shaft 62 having a pulley 64 thereon on which is trained a flexible strip 66, acting as a belt, connected to the table at its ends. Upon rotation of the pulley, the table is driven in the respective direction. The coils A and B are operably connected to a common switch blade 68 associated with reversing contacts B1 and A1, and upon its engaging one or the other of the contacts A1 or B1, the appropriate circuit portion is energized to the motor 34, driving the latter in the respective direction. The relay coils A and B, actuated in a manner to be described in detail hereinbelow, are arranged for operating in opposite directions.

Referring in detail to the circuit of FIG. 5, this circuit includes a main transformer 70 having a primary 70p connected with a suitable source of A.C. current and adapted for selective voltage such as 115/230 v. or 230/460 v. The transformer 70 includes a number of secondaries, all designated 70s but certain ones hereinafter referred to individually include additional reference designations.

In each circuit portion 58, 60 is a pair of tandem tubes including an amplifier tube 72A or 72B, and a relay tube 74A or 74B, respectively. Also included in each circuit portion and associated with the corresponding tandem tubes are potentiometers 76A and 76B. The tubes 72, 74 and the potentiometer 76 in each circuit portion may be considered equivalent to the similar arrangement in my co-pending application referred to above. The potentiometers 76, upon being set manually at predetermined points, control the voltage otherwise provided, as described hereinbelow, imposed upon the tubes 72 and 74 and upon appropriate setting of the potentiometers, the tubes 74A and 74B effect a reversing operation in the corresponding relay coils A and B referred to above. The settings of the potentiometers 76 may be made by manual actuating means shown in FIGS. 5, 6 and 7 of my said co-pending application, and fully described therein, being utilized for predetermining the range of movement of the table 12, as to length of travel, and as to the position of a less than full range within a maximum range.

The circuit portions 58 and 60 include various ones of the secondaries 70s of the transformer 70 for controlling the tubes, as stated above, and among these are secondaries $70s_1$ and $70s_2$. The secondary $70s_1$ is connected in series with the primary 54p of the transformer 54 while the secondary $70s_2$ is connected in series with the primary 56p of the transformer 56. Associated with the transformers 54 and 56 are additional transformers 78 and 80 and connected with the latter two transformers is another secondary $70s_3$. The latter secondary provides voltage for the primaries 78p and 80p. The secondaries 78s and 80s are connected in series respectively with the secondaries 54s and 56s.

For controlling the transformers 78 and 80, there is provided a set of armatures 82 and 84 similar to the armatures 50 and 52 described above. The armatures 82 and 84 are arranged for projection into and withdrawal from the coils of the transformers 78 and 80, and for this purpose are arranged on a beam 86 mounted on a shaft 88 (FIGS. 4 and 5) for oscillation about the axis of that shaft. A control knob 90 (FIG. 4) is provided on the shaft for adjusting the armatures 82 and 84 and upon rotation of the control knob and shaft, the armatures are alternately projected and withdrawn from the coils of the corresponding transformers in accordance with the direction of rocking of the shaft.

Associated with the transformers and the armatures just described are additional transformers 92 and 94 for providing additional control of the reversing means. The secondaries 54s and 78s are connected across the primary 94p of the transformer 94 and, conversely, the secondaries 56s and 80s are connected across the primary 92p of the transformer 92. Connected across the secondaries 92s and 94s are potentiometers 96 and 98 respectively for controlling the effective voltage in those secondaries, which is imposed on the opposite secondaries 56s and 54s respectively in opposition to the voltage of the latter secondaries in additive effect to the voltage from their own primaries. The effect of this arrangement will be fully explained in detail hereinbelow, but briefly the effect is to advance the reversing function of the tubes.

The potentiometers 96 and 98 are shown in FIG. 3 mounted on a shaft 100 on which is a control knob 102. Also mounted on the shaft 100 is an additional control element 104 which in the present instance may be a potentiometer for controlling the speed of the motor 34. In a single operation in which the speed of the motor is, for example, increased, the voltage controlled by the potentiometers 96 and 98 is varied, as by increasing it, and this conjoint operation is performed by rotation of the shaft 100. The invention is not limited, however, to a common mounting of these three elements and their conjoint control, but this is a preferred arrangement.

Upon movement of the table 12 in either assumed direction, e.g., to the right (FIG. 2), the armature 50 is projected into the coils of the transformer 54, and a negative voltage is developed at the secondary 54s, while positive voltage is provided in the secondary 78s. As in the operation of the apparatus in my patent referred to above, the voltage produced by the armature 50 operating relative to the transformer 54 imposes a corresponding voltage upon the amplifying tube 72A. When the tubes 72A and 74A are conducting, the relay coil A is in a first position, and upon an effective voltage change on the tubes, the relay coil is operated and the switch 68 (FIG. 3) is reversed. The reversing operation takes place when the voltage imposed on the tube 72A or 72B reaches zero. This is accomplished when, for example, the negative voltage developed in the secondary 54s reaches a value corresponding to the positive voltage in the secondary 78s, and the net result is zero. By controlling the condition of the positive voltage in the secondary 78s, the zero point of the effective voltage in the secondary 54s, developed in response to movement of the table, can be controlled. The negative voltage produced by the secondary 94s is provided in additive effect to that of the secondary 54s, and in that manner further controls the point at which the effective voltage of the secondary 54s reaches zero and the reversing operation take place. More specifically, the greater cumulative negative voltage in the secondaries 54s and 94s produces a zero condition at an advanced point relative to the movement of the table and consequently causes reversing operation at an advanced point.

It will be appreciated that the description above concerning the movement of the table in a first direction is similar and opposite in the opposite direction, namely, the voltage in the secondary 56s is opposite to the voltage in the secondary 80s, and the voltage in the secondary 80s is increased by that in the secondary 92s which is in the same sense, the various windings being oriented in appropriate manner to produce the effects stated.

After the controlling voltage reaches the desired reversing point, namely, zero, and the electronic tubes perform their own consequent reversing operation, there is the normal and usual lag until the driving motor 34 actually operates to perform the reversing movement of the table. This lag is increased, relative to absolute movement in distance of the table, upon increase in speed of the table and, similarly, upon increased weight. Upon increase of the speed due to a predetermined setting of the control knob 102 (FIG. 3) and consequent setting of the potentiometer 104, the voltages of the secondaries 92s and 94s are effectively increased through the settings of the potentiometers 96 and 98. Accordingly, for any given settings of the limits of the range of movement of the table through the potentiometers 76A and 76B, the compensation for the lag referred to above is provided for, and increased in proportion to the increase in speed of the table. Regardless where a smaller range of movement of the table is located within the maximum permitted range, the reversing operation is advanced in point of time relative to the intended point of reversal.

The compensation for over run is increased in proportion to the length of the range of movement since the extent of projection of the armatures 50 and 52 into the respective transformers and withdrawal therefrom is increased, as will be understood in view of the greater projected dimension of the taper bar 36. Hence, any given setting for producing compensating voltage for over run is effectively increased for the longer range of movement of the table.

At minimum speed of movement of the table, the compensation for over run is minimized or substantially eliminated, as it will be appreciated that compensation at minimum speeds is not ordinarily required. This feature is considered to be an important feature, in that it is automatically provided for and does not require conscious determination by an operator, and when greater compensation for over run is required, it is provided automatically when an increase in speed is provided. The same is true with respect to greater length of travel of the table, as it will be appreciated that a time factor is involved in attaining maximum speed in most kinds of driving means. Resistances 106 and 108 may be interposed in series with the potentiometers 96 and 98 respectively to provide a fail-safe condition in the event of improper connection at the center arms of those potentiometers.

Many machines of the type illustrated in FIGS. 1 and 2 are extremely expensive and in the economies involved in installing such a machine, it is important that its use be made most efficient, with a minimum of unused time. For example, the time required for finishing a work piece is calculated closely and the costs of finishing such pieces must warrant the expense of the machine over a given period of time. Any time lost is expensive and much lost time occurs in the reversing operation as when, for example, the operating tool passes by the end of the work piece and until it again engages the work piece in the reverse direction. In the use of the apparatus of the present invention, this loss of time is substantially eliminated since the time for the reversing operation is minimized and from a practical standpoint eliminated, and this is done automatically without special manipulation by the operator for each operation to be performed. The limits of the range of movement of the table are set by the potentiometers 76A and 76B in accordance with the length of the work piece, and if the table is to be moved fast or slow, the reversing operation takes place at substantially the same point closely beyond the work piece.

While I have herein shown a preferred embodiment of the invention, it will be understood that changes may be made therein within the scope of the appended claims.

I claim:

1. In apparatus for controlling the movements of a reversing table, exemplifying an oscillating part and a reciprocating part, the combination comprising means for driving the table in each of opposite directions, means for reversing the driving means for reversing the table, said reversing means including a relay associated with each end of the range of travel of the table, a circuit portion for each relay means, means for producing voltage for controlling each relay means including a coil and armature arranged for varying the voltage in response to movement of the armature in the coil, each relay means being actuated in response to reduction of voltage therein for effecting a reversing operation, the table being operative for moving the armatures in the respective coils and thereby reducing the voltage on the relay means corresponding to each end of the travel of the table as it approaches that end and increasing the voltage on the relay means at the opposite and receding end, whereby to actuate the reversing means as the table approaches each end of its travel, manually actuated means operable during movement of the table for varying the speed thereof, and means for imposing voltage generated at the receding end on the relay means at the approaching end in proportion to the speed of travel of the table whereby to actuate the reversing means at an advanced time relative to the approach of the table to reversing position to counteract for over run relative to the predetermined point.

2. Control apparatus for a machine having a member alternately movable in opposite directions through a predetermined maximum range, comprising electrically controlled reversible means for driving the movable member in each of opposite directions, main transformer means corresponding to each direction of movement of the movable member, an armature in each main transformer means and continuously actuated by the movable member in the corresponding direction of movement thereof and operative for controlling voltage in the corresponding transformer continuously throughout the range of movement of the movable member, in accordance with the position of the movable member in its range of movement, means operative upon development of voltage of predetermined value in each main transformer means for reversing the driving means, and manually settable means including over run transformer means corresponding to each direction of movement of the movable member, each being controlled by the voltage developed in a corresponding one of said main transformer means and imposing it in additive effect on the other, and being thereby operative in any given setting thereof for varying the voltage value in the corresponding said main transformer means for all positions of the movable member throughout its movement in the corresponding direction.

3. The invention set out in claim 2 in which means is included for adjustably varying said range of movement, and each said over run transformer means is operative for advancing the voltage value of the corresponding main transformer means, relative to the approach of the movable member to the corresponding end of its range of movement, and thereby advancing the reversing of the drive means.

4. The invention set out in claim 2 in which range controlling transformer means with manually adjustable armatures therein are provided in series with respective main transformer means.

5. The invention set out in claim 4 in which manually adjustable means is provided for controlling the speed of movement of the movable member, and the over run transformer means are operatively connected with the speed conrtolling means and thereby operative for advancing the reversing of the drive means in response to increasing the spread of said movable member.

6. Control apparatus for use on a machine having a reversing part and electrically controllable reversible means for driving the part, comprising tube and relay means associated with each end of the range of movement of the part for reversing the drive means, first transformer and movable armature means associated with each tube and relay means, means controlled by the reversing part for moving said first movable armature means throughout its movement in corresponding directions for developing voltage in and thereby controlling the respective tube and relay means and reversing the driving means at each corresponding end of the range of movement of the reversing part, second transformer means associated with each first transformer means, circuit means for energizing the primary of each second transformer means from the secondary of the associated first transformer means, circuit means for imposing the voltage of the secondary of each second transformer on the nonassociated first transformer means and thereby affecting the control by the latter of said tube and relay means, and potentiometer means in each said last circuit means and manually actuatable during movement of the reversing part for varying the said imposed voltage whereby to adjust the points of actuation of the reversing means.

7. The invention set out in claim 6 in which the said imposed voltage is increased or decreased, respectively, throughout the range of movement of the reversing part, whereby to advance or retard the points at which the reversing means operates, relative to the ends of the range of movement, as the range is increased or decreased respectively.

8. The invention set out in claim 6 in which the driving means is of variable speed character, manually actuated means is provided for controlling the speed of the driving means, and common manual actuating means is provided, and the potentiometer means and speed controlling means are mounted on the common manual actuating means for advancing and retarding the points at which the reversing means operates, relative to the ends of the range of movement of the reversing part, as the speed of the part is increased and decreased.

9. Control apparatus for a machine having a member alternately movable in opposite directions through a predetermined maximum range, comprising electrically controllable variable-speed reversible means for driving the movable member in each of opposite directions, manually actuatable means for varying the speed of the driving means, tube means associated with each direction of movement of the movable member, means controlled by each tube means for reversing the driving means, main signal producing means responsive to movement of the movable member in each direction and operative for producing a signal that is progressive throughout the movement of the movable member and imposing it on the respective tube means and thereby actuating the corresponding reversing means, supplementary signal producing means associated with each direction of movement of the movable member, circuit means operative for transmitting signals from the main signal producing means to and thereby forming corresponding signals in respective ones of the supplemental signal producing means, circuit means operative for transmitting signals from the supplemental signal producing means to and thereby forming signals in the opposite ones of the main signal producing means and thereby modifying the signals imposed on the tube means, and means connected with said manually actuatable means for modifying the signals produced in the supplemental signal producing means in accordance with varying the speed of the driving means whereby to advance the imposition of effective signals on the tube means relative to the approach of the movable member to the respective ends of its range of movement.

References Cited in the file of this patent
UNITED STATES PATENTS

| 2,486,151 | Gross et al. | Oct. 25, 1949 |
| 2,767,363 | Chubb | Oct. 16, 1956 |